March 18, 1947.  E. A. LARSSON  2,417,694
AUTOMATIC BRAKING MECHANISM FOR VEHICLES
Filed Oct. 6, 1944  4 Sheets-Sheet 1

Inventor
ERNST A. LARSSON
By
Attorney

March 18, 1947. E. A. LARSSON 2,417,694
AUTOMATIC BRAKING MECHANISM FOR VEHICLES
Filed Oct. 6, 1944 4 Sheets-Sheet 2

Inventor
ERNST A. LARSSON
By
Attorney

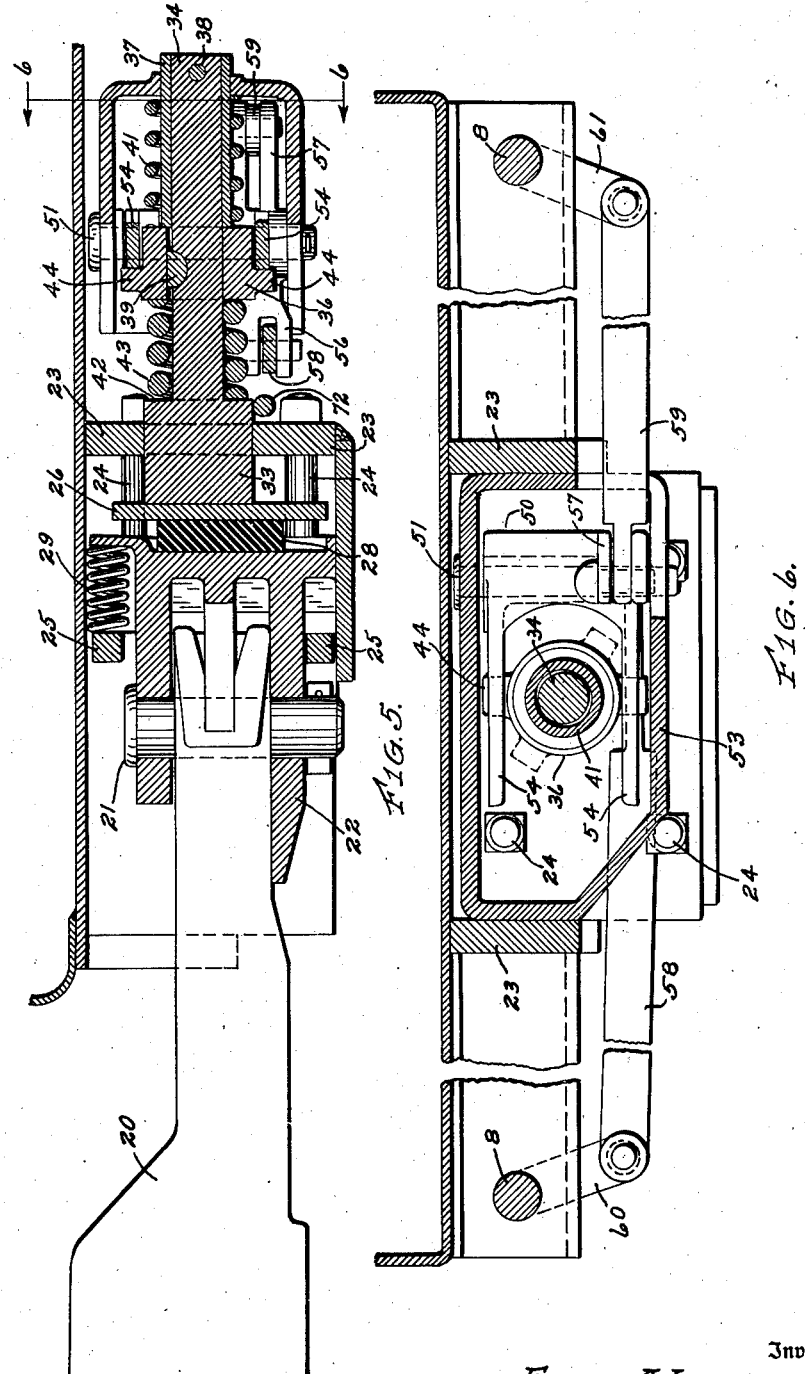

March 18, 1947. E. A. LARSSON 2,417,694
AUTOMATIC BRAKING MECHANISM FOR VEHICLES
Filed Oct. 6, 1944 4 Sheets-Sheet 4
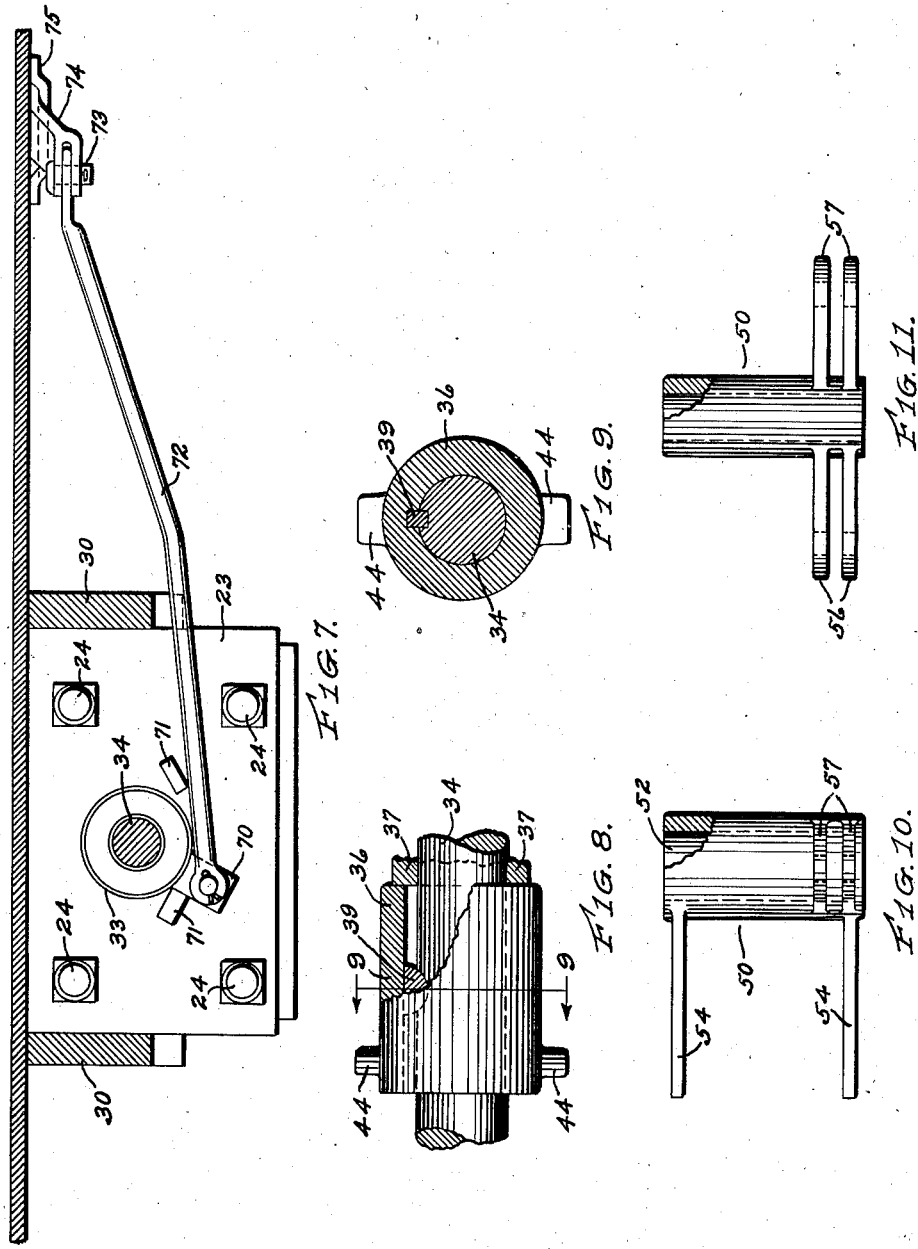
Inventor
ERNST A. LARSSON
By
Attorney Patented Mar. 18, 1947

2,417,694

UNITED STATES PATENT OFFICE 2,417,694

AUTOMATIC BRAKING MECHANISM FOR VEHICLES

Ernst A. Larsson, Mansfield, Ohio, assignor to The Ohio Brass Company, Mansfield, Ohio, a corporation of New Jersey Application October 6, 1944, Serial No. 557,475

14 Claims. (Cl. 188—147)

My invention relates to braking mechanisms and has particular reference to such mechanism for use on cars where it is quite impossible to apply the brakes to each car in a train as in the case of mine cars.

One object of my invention is to provide a mechanism whereby the brakes on each car of a train of cars may be automatically applied as the train moves down grade.

Another object of this invention is to provide mechanism to operate the brakes on the cars of a train of cars moving down grade whereby the braking effort on the forward cars will be greater than upon the rear cars.

Still another object of my invention is to provide mechanism associated with a car coupler and operated by the movement of the coupler head to apply the brakes on a car.

Another object of my invention is to provide means for operating a brake system by utilizing the longitudinal movement of the coupler head relative to the car when the force acting upon the coupler head reaches a predetermined value.

A still further object of my invention is to provide means operated by the movement of the coupler head to actuate a brake system in which the braking action does not begin until the forces acting upon the coupler head, as in moving down grade, reach a predetermined value and also the braking action does not increase when the forces reach a predetermined value higher than the first said predetermined value.

Still another object of my invention is to provide means to automatically apply the brakes on a car moving down grade and including means to limit the braking application which can be made under such circumstances.

Difficulty is being experienced in the operation of long trips or trains of mine cars in moving down grade because the individual cars are not provided with automatic brakes or brakes which may be operated on the cars from the locomotive at will of the driver or engineer.

The result is that on long down grades the weight of the cars is pushing against the locomotive and the driver attempts to control the speed of the trip by the application of the brakes on the locomotive, but after the maximum effect of the brakes on the locomotive is reached the speed of the trip down grade will increase in spite of the brakes applied on the locomotive and this sometimes results in derailment and the wrecking of cars and locomotives.

The operator of a locomotive often tries to overcome the difficulty by "setting" the hand brakes on some of the cars in the trip when starting down long grades, but considerable difficulty is experienced in this procedure because, if the hand brakes are not pulled extremely tight, then the braking effect on the cars on which the brakes have been set is not sufficient to control the down grade speed of the rest of the trip, and if the hand brakes are pulled too tight, then the rotation of the wheels on those cars stops resulting in flat spots being worn on the tread of the wheels so that the wheels must be remachined or scrapped.

The mechanism herein described is for the purpose of overcoming these operative difficulties by automatically applying the brakes of the individual cars by employing the buff or compressive force set up in the car couplers of a train of cars when the train is moving down grade with brakes "set" on the locomotive at the forward end of the train.

In the drawings:

Fig. 1 is a schematic drawing showing a brake system on a car and which is primarily intended to be operated by hand and also shows in dotted lines a portion of my invention as applied to this particular brake system and will assist in understanding my description later on.

Fig. 5 is a vertical view in partial section of my invention taken as on the line 5—5 of Fig. 4.

Fig. 6 is a view in partial section of my invention taken as on line 6—6 of Fig. 4.

Fig. 7 is a partial section on line 7—7 of Fig. 4.

Fig. 8 is a side view of a collar mounted on a plunger to show the keyed sliding mounting.

Fig. 9 is a section on line 9—9 of Fig. 8.

Fig. 10 is a side view of a forked lever whereby motion is transmitted from the coupler to the brake system.

Fig. 11 is a back view of Fig. 10.

Figure 1:
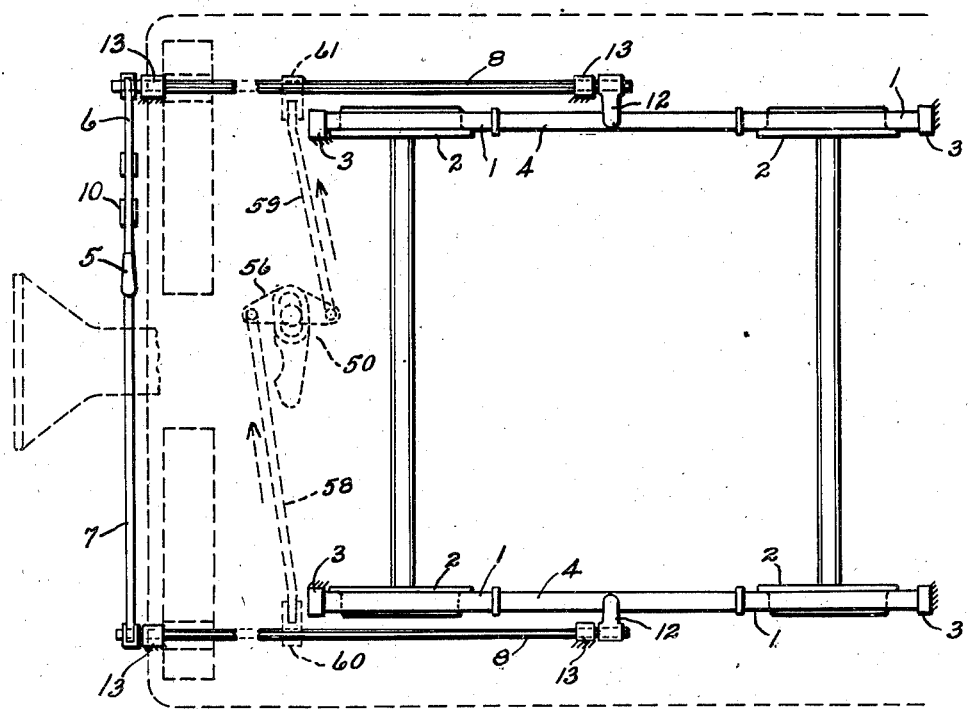

In order to freely discuss the application and operation of my invention, I have shown schematically in Fig. 1 a typical brake system as now used on some mine cars.

Figure 2:
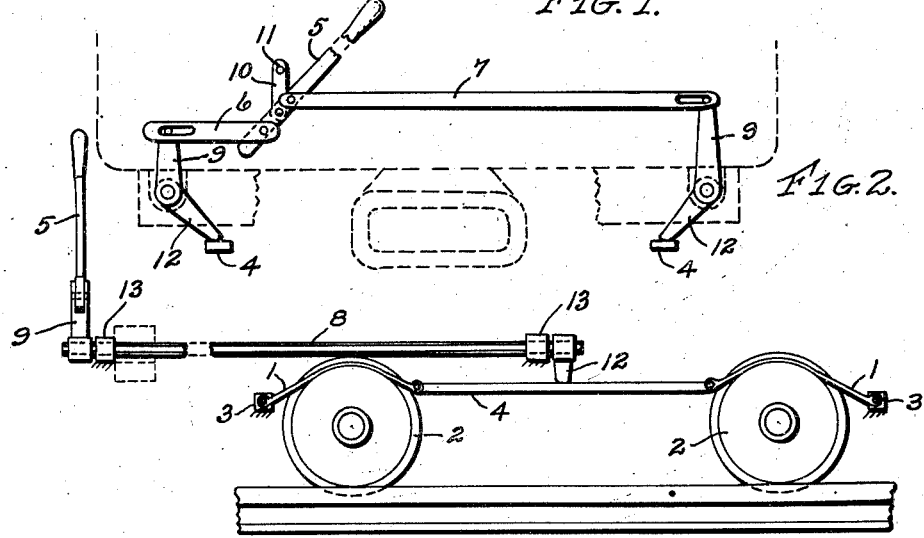
Fig. 2 is a schematic drawing of the couplers and of the brake system of Fig. 1.
Figure 3:
Fig. 3 is a schematic view of a side view of the brake system of Fig. 1.

In Figs. 1, 2 and 3 I have made no attempt to show the car structure or method of supporting the brake system thereon as I am not claiming the brake system shown. My invention is applicable to the operation of other brake systems.

Let it be assumed that my brake mechanism is to be applied to a mine car of about 3500 pounds weight unloaded and 10,000 pounds loaded and is equipped with a brake system as disclosed in Figs. 1, 2 and 3.

A short description of the brake system of Figs. 1, 2 and 3 is as follows:

Brake bands 1 engage the wheels 2 and are held fixed at 3 and are connected by brake beams 4.

On the forward or loading end of the car is mounted the hand operating lever 5 by means of which the brakes are applied. This mechanism includes the links 6 and 7 pivoted to the handle bar 5.

The links 6 and 7 are associated with rotatable brake shafts 8 through the medium of the cranks 9 fixed to the shafts 8. By making a slotted connection between the cranks 9 and links 6 and 7 respectively, the pressure is equalized on the brake bands 1 since the lever 5 is pivoted on the link 10 which is pivoted to the car body at 11.

Fixed to the brake shafts 8 are cranks 12 which bear upon the brake beams 4 to move same. The brake shafts 8 are mounted in bearings or supports 13 which are secured to some part of the car body.

When the handle 5 is operated, the links 6 and 7 are moved towards the center of the car end; this transmits movement to the cranks 9 which in turn rotate the brake shafts 8; this rotates the cranks 12 and the free ends thereof move downward, pressing against the brake beams 4 and moving same downward which increases the pressure of the bands 1 upon the tread of the wheels 2. The construction and relation of the parts 5, 6, 7, 10 and 11 with respect to each other and to the cranks 9 tend to equalize the pressure of the bands 1 upon the four wheels.

Several parts are shown on Figs. 1, 2 and 3 in dotted lines which form no part of the brake system per se above described, but which will assist later in understanding my invention, especially the transmission of motion from the car coupler to the brake system.

In order to create a movement which may be transmitted to the brake system to operate the same I modify the coupler disclosed in Fig. 6 of Patent 2,225,418 and in Figs. 6 and 7 hereof I show the coupler head which I make use of.

Figure 4:
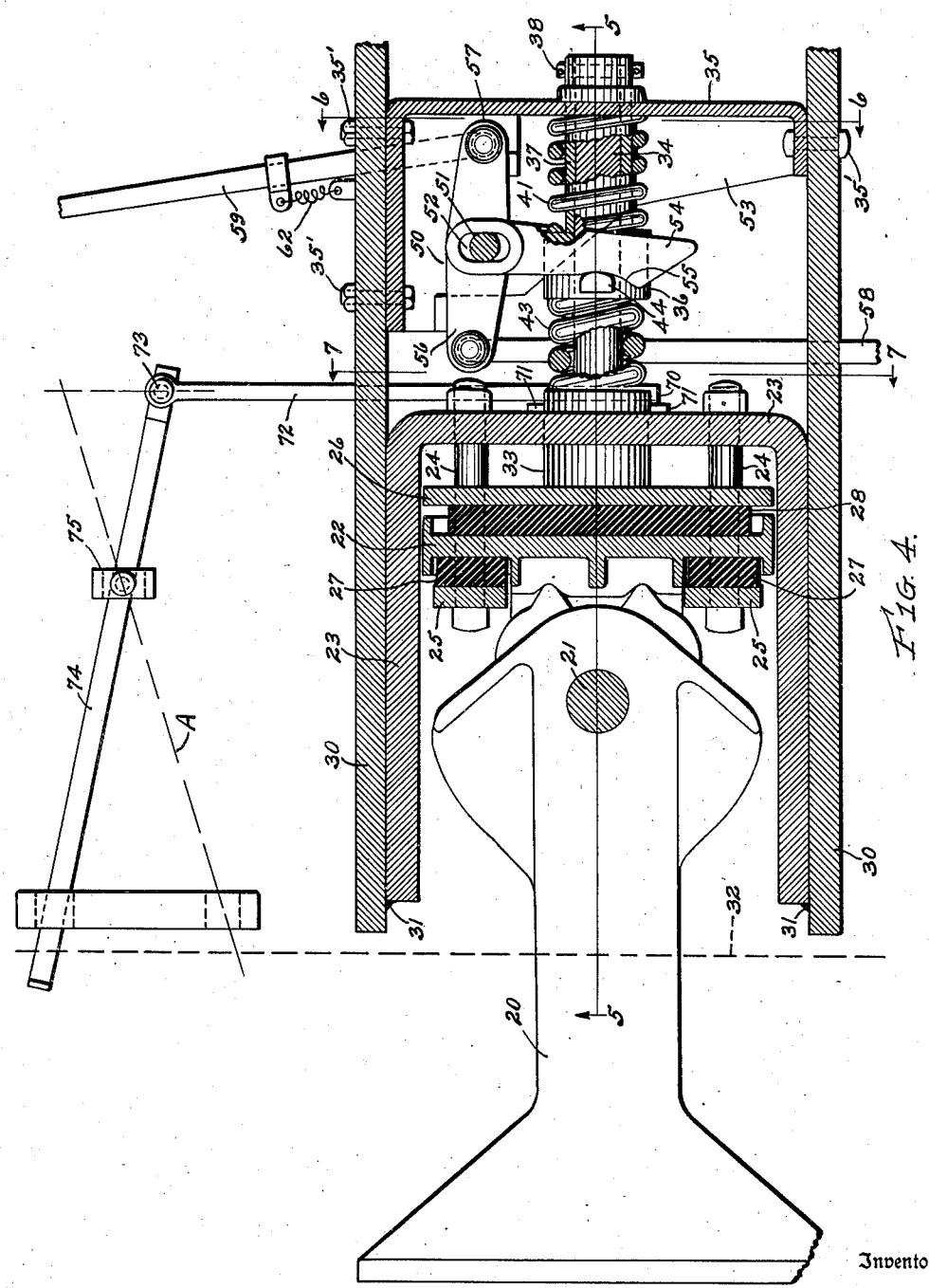
Fig. 4 is a top plan or horizontal view in partial section showing a car coupler and mechanism for transmitting the compressive force on the coupler to the brake system of Fig. 1. The section is taken on a horizontal plane above the central horizontal plane.

I prefer to mount the coupler head shown in Figs. 6 and 7 on the forward end of the car and place a counterpart head as shown in Figs. 4 and 5 of Patent 2,225,418 on the rear or unloading end of the car.

A brief description of my coupler to which modifications are applied is as follows:

The head 20 is pivoted at 21 for lateral swing. The pivot 21 is mounted on a bumper or support plate 22 forming part of the complete anchorage.

The bumper plate 22 is mounted in the anchorage housing 23 by bolts 24. To the front and rear respectively of support plate 22 and spaced therefrom are plates 25 and 26. The spaces between plate 22 and plates 25 and 26 are maintained respectively by the pads 27 and 28 which are preferably of resilient material such as rubber or an equivalent material and which absorb the normal buff and draft forces to which the coupler is subject under normal operation.

The coupler shown in Fig. 4 differs from that shown in the aforesaid patent in that the plate 26 against which the member 28 is pressed does not constitute a fixed member as in the patent. The plates 22 and 26 and the member 28 move longitudinally rearward upon the bolts 24 under an abnormal buff or compressive force as when the cars are on or moving down grade.

The construction of the plates 22, 25 and 26 and their relation to each other and to the members 27 and 28 and to the coupler heads 20 are such that they "center" the head when the head is spaced from its companion head. The spring 29 aids in holding the coupler head in a horizontal position.

The car is equipped with sills 30 between which is placed the complete anchorage housing 23 and which is held in place by through bolts or by welding as at 31.

Further description of the coupler upon which above description is based may be had by reference to Patent 2,225,418.

The front end of the car body is represented by the dotted line 32.

It will be understood my invention does not include any specific construction of car therefore I have refrained from complicating the disclosure by detailing a car body in combination with my improved coupler and its application to a brake system.

Fig. 4 also shows the manner in which my improved coupler may be connected to the brake system shown in Figs. 1, 2 and 3.

The plate 26 is held in its normal forward position by the spring held plunger 33 which extends through the rear wall of the housing 23 in slidable relation thereto and is provided with an extension 34 of reduced diameter which extends through the supporting bracket 35 which in turn is secured to the sills 30 by bolts 35.

Slidably mounted on the plunger extension 34 is a collar 36, and a sleeve 37 is also mounted on the plunger extension 34 and held in place by the pin 38 which may engage the rear wall of the bracket 35 and limits the forward movement of the plunger 34 and sleeve 37. The forward end of the sleeve engages the rear face of the collar 36 thus preventing rearward movement of the collar 36 relative to the plunger extension 34.

The collar 36 is prevented from rotating relative to plunger 33 by means of a key 39 and key slot (see Figs. 8 and 9), but not from moving longitudinally on the plunger extension forward of the sleeve 37.

Mounted on the sleeve 37 between the collar 36 and bracket 35 is a spring 41 and for use with the weight of car referred to on page 4 hereof experience shows the spring 41 should have a normal or installed compressive force of about 500 pounds.

Mounted on plunger extension 34 between the collar 36 and the shoulder 42 of the plunger 33 is a spring 43 which in this case exerts when installed a normal or installed compressive force of about 5000 pounds upon the collar 36.

The springs 41 and 43 and the pressure set up thereby should be so chosen as to meet the weight of the car on which they are installed.

The spring 41 normally maintains the plunger 33, its extension 34 and collar 36 in their forward position with the forward end of the plunger 33 pressed against plate 26 which is thereby held against movement rearwardly under normal buff forces applied to the coupler head as in case of coupling cars and this force is taken up by the resilient member 28. All draft forces are absorbed by the resilient members 27. The pin 38 is spaced from the bracket 35 to insure the plunger normally engaging the plate 26 and the members 27 against the forward abutments 25.

The longitudinal movement of the coupler head under normal buff and draft forces is practically nil as the construction is such that those forces are all practically absorbed by the resilient pads 27 and 28.

The spring 43 is stronger than the spring 41 and will normally hold the collar 36 against the end of the sleeve 37. When an abnormal buff or compressive force is imposed on the coupler head 20 sufficient to overcome the counterforce of spring 41 as when the car is on down grade, then plates 22 and 26 together with member 28 will move backward and cause the plunger 33, its extension 34, spring 43, collar 36 and sleeve 37 to move backward against the counterpressure of spring 41, the amount of movement depending upon the amount of compressive force upon the coupler head in excess of the normal installed pressure of spring 41.

The greater the compressive force on the coupler head, the greater will be the rearward movement of the plunger 33 and its extension 34 whereby the spring 41 will be further compressed but its tension will never be sufficient to materially affect the operation of spring 43. The main function of spring 41 is to prevent rearward movement of the coupler head or anchorage parts until the compressive forces on the coupler head are greater than the installed counterforce of the spring 41.

This rearward movement of the plunger 33 and its extension 34 may continue under increased compression on the coupler head until the plate 26 engages the anchorage housing 23 at which time the maximum pressure exerted by the spring 43 is reached and which is the maximum force which can be applied to the collar 36 tending to move it rearwardly.

Thus the spring 41 determines when rearward movement of the plunger 33, extension 34, sleeve 37, collar 36 and spring 43 may begin, and spring 43 determines the maximum pressure which may be applied to the collar 36 tending to move it longitudinally rearward and determines the maximum force which may be applied to the brake system.

In order to make use of this rearward movement of the plunger 33 and its extension 34 under control of the springs 41 and 43 in operating a brake system, means is provided to apply a moving force to the brake system.

While I have disclosed my improved coupler as applied to a brake system of a specific construction, it may be applied to other systems.

To operate the brake system, there is associated with the support bracket 35 the forked link 50 which is pivoted thereon by the pin 51 operating in the slotted opening 52 of link 50. The link and pin are positioned between upper and lower plates 53.

The arms 54 span the collar 36 which is provided with lugs 44 which engage the arms 54 and when set to operate the brake system the lugs rest in a slight notch 55.

To the lower portion of the link 50 are oppositely projecting arms 56 and 57. In this particular disclosure these arms project in substantially parallel relation to the longitudinal axis of the coupler.

Extending from the arms 56 and 57 are, respectively, rods 58 and 59 which lead to and are connected respectively to levers 60 and 61 which are secured to the brake rods 8 to rotate same whereby the brakes are set. The application of the forked link 50 to the brake system is shown by dotted lines in Fig. 1.

In Fig. 7 I show means for changing the mechanism for operating the brake system from operation to inoperation and vice versa. Fixed to the plunger 33 is a depending lug 70 which rotates with the plunger 33 and extension 34, between the stops 71 attached to the end face of the anchorage 23.

Leading from the lug 70 is a rod 72 pivoted at 73 to a lever 74 which is pivotally mounted between its ends to bracket 75 conveniently mounted on the car frame or body and extends to and beyond the end face of the car where the lever is manually operable to actuate the plunger.

When the lever 74 is moved from the position shown in Fig. 4 to its other position shown by the dotted line A, the plunger 33 and extension 34 will be rotated 60° which in turn will rotate the collar 36 and thereby move the lugs 44 out of operative engagement with the arms 54 as shown by dotted lines in Fig. 6.

The operation of my invention is as follows:

When a car provided with the above described mechanism is coupled with other cars forming a train or trip and which is moving down grade, a compressive force will be exerted on the coupler head. The degree of this force will depend to a large extent upon the position which the car holds in the trip, that is, if the car is first car back of the locomotive then the pressure of all the other cars is exerted upon the coupler head on the first car, but if the car is the last car in the trip, then the pressure on the coupler, if at the front end of the car, will be only that due to the weight of the car itself.

In the example set forth above, when the longitudinal compressive force acting upon the coupler head reaches 500 pounds, the support 22 including the parts 26 and 28 and also the plunger 33 and extension 34 together with the spring 43 and collar 36 and sleeve 37 will start to move backward compressing the spring 41. This movement will cause the lugs 44 to rotate the forked link 50 which in turn will move the rods 58 and 59 longitudinally.

As the collar 36 begins to move back imparting motion to the rods 58 and 59 the slack in the various parts will be taken up and the link 50 adjusted due to the slot 52.

As pressure on the coupler head increases the above parts will continue to move backward in proportion to the increasing pressure until all slack is eliminated and actual braking action begins and increases as the compression force on the coupler head increases until a compressive force of 5000 pounds or the installed force of spring 43 is reached, then the plunger 33 and extension 34 will move back against the increasing pressure of spring 43 until the rearward movement is checked as previously described. When this condition is reached the spring 43 has reached its maximum counter force and the maximum pressure possible is applied to the brake system regardless of any further increase of compressive force upon the coupler head.

When the pressure is removed from the coupler head the various parts return to their normal position as shown in Fig. 4 and the spring 62 acting on the rod 59, or other means, will return the brake system and link 50 to normal. After the actual braking action begins after all slack has been absorbed, the brake system will set up a back pressure which will react upon the collar 36 and tend to hold it against further backward movement but the pressure of spring 43 will keep on increasing as the plunger 33 continues to move thus effecting an increase of the braking action up to the limit determined by spring 43.

By proper selection of springs 41 and 43, taking into consideration their installed and maximum pressures and the maximum possible movement of the plunger 33 and other associated parts with regard to the weight of cars and the brake system involved, mechanism can be provided which will determine the minimum force which can be applied to the coupler head to start an application of the brakes and also the maximum brake pressure which can be reached, and by such proper selection of installed and ultimate counter force of these springs the described mechanism will cause the brakes to be applied automatically on cars travelling down grade before a dangerous speed has developed and the maximum obtainable brake pressure will never reach a point where the wheels on the car stop rotating and wear flat.

The brake application on the various cars in a trip equipped with my invention will automatically vary with the position of the cars in the trip and the grade, the most forward car having the greatest brake application and the last car having the least brake application and the application on the intermediate cars varying accordingly.

My invention is not limited to the structure illustrated nor its application to the specific brake system described, as various modifications may be made in the structure and may be applied to various brake systems without departing from the spirit and scope of the invention as set forth in the appended claims.

I claim as my invention:

1. In combination, a car body provided with a brake system and a coupler subject to movement relative to the car body when a compressive force is applied longitudinally to the coupler, means interposed between the coupler and brake system and operatively associated with each to transmit movement from the coupler to the brake system when the compressive force exceeds a predetermined value and means associated with the coupler to check said movement to the brake system when the compressive force reaches a higher predetermined value than the first said predetermined value and other means interposed between the coupler and the brake system and operatively associated with each to check the said movement from the coupler to the brake system when the applied pressure of the brake system reaches a predetermined value.

2. In a car coupler comprising a coupler head and an anchorage including a rearwardly longitudinally movable resilient support to which the coupler head is attached to absorb buff and draft forces and a housing in which the movable support is mounted and by which the anchorage and coupler head are secured to the car, the combination with the anchorage of resilient mechanism provided with a spring having an installed compressive force of predetermined value to prevent said longitudinal movement of the movable support and coupler head until the buff force thereon exceeds said predetermined value and cooperative means on the movable support and on the housing to prevent further longitudinal movement of the coupler head and its support after the buff force on the coupler head has reached a predetermined value which is greater than the aforesaid predetermined value.

3. In a mechanism to operate a brake system on a car, in combination, a coupler head, longitudinally movable means to support the coupler head and absorb the buffing forces thereon up to a predetermined value, projecting means extending rearwardly from the said movable means and movable rearwardly with the movement of the movable means, fixed means to support the free end of the projecting means, a collar slidably mounted on the projecting means intermediate its end, a spring interposed between the collar and the fixed means and having an installed compressive force sufficient to hold said movable means and coupler in their forward position until the buffing force upon the coupler head exceeds the said predetermined value, connecting means operatively associated with the said brake system whereby the brake system may be operated, means on the collar cooperating with means on the connecting means whereby motion is imparted from the said projecting means to the connecting means, and spring means having an installed compression of predetermined value mounted on the projecting means to impart movement to the collar as the projecting means moves rearward and thereby operate the connecting means when the buffing force on the coupler head exceeds the first said predetermined value, the said spring means limiting to its installed value the maximum force which may be applied to the collar to move the same.

4. A mechanism to automatically operate a braking system on a car, in combination, a coupler head, a frame to support the head on the car and to move rearwardly under compressive forces in excess of a predetermined value, means interposed between the head and frame to support the head from the frame, a separately formed elongated member projecting from the interposed means and movable longitudinally in one direction when the coupler head is subjected to said predetermined compressive forces, the interposed means provided with resilient means to absorb compressive forces less than said predetermined forces, means to check the movement of the coupler and the interposed means when the compressive forces are of a predetermined value greater than the first said predetermined forces whereby the rearward movement of the elongated member is checked after it has moved a predetermined amount, control mechanism associated with the elongated member including spring means under compression to prevent the movement of the elongated member in said one direction until the compressive force on the coupler head exceeds said predetermined value and to move the elongated member in its other direction and to also return the coupler head and interposed means to their original positions when the compressive force upon the coupler head falls below a predetermined value, a control spring under compression associated with the control mechanism and moved longitudinally with the elongated member when it moves rearwardly and other means slidably mounted on the elongated member and between the said springs and subject to the opposing pressure of the springs and connecting means on the said other means whereby the brake system may be connected thereto and operated by the mechanism, the compression of the control spring being normally greater than that of the first said spring and limiting the pressure which the brake system may apply.

5. In combination, a car, a frame mounted on the car, a coupler head to move rearwardly under a compressive force in excess of a predetermined value, interposed means to support the head from the frame, an elongated member projecting rearwardly from the interposed means and movable longitudinally in a rearward direction when the coupler head is subjected to the said excess predetermined forces, means to definitely check the movement of the coupler and interposed means and elongated member when the compression force acting on the coupler head exceeds a predetermined value greater than said excess predetermined forces, a spring associated with the elongated member of sufficient compressive force at all times to oppose the rearward movement of the elongated member and the interposed means and the coupler head but to return them to their normal positions when the compression force falls below the said predetermined value, a control spring normally under a maintained compression of a predetermined value mounted on the elongated member to determine the pressure which the brake system may exert, a slidable member mounted on the elongated member and subject to the opposing compressive forces exerted by the two springs, the compression force of the first said spring being less than that of the control spring and acting through the slidable member and the control spring and frame to effect return movement of the elongated member to its normal position, and means associated with the slidable member and operable by the slidable member whereby movement may be transmitted to the brake system.

6. A car coupler and associated mechanism to actuate a brake system comprising, a coupler head, a frame to be mounted on a car and support the coupler head in longitudinal movement relative thereto, an elongated member projecting rearwardly from the coupler head and longitudinally movable relative to the frame, a control spring which will determine the minimum compressive force which will start a backward movement of the elongated member and the actuation of the brake system, and means to check the backward movement of the elongated member and actuation of the brake system when the compressive force upon the coupler head exceeds a predetermined value which is greater than the first said compressive force, the actuation of the brake system taking place only during the period between said predetermined forces, a control spring to determine the maximum pressure which can be attained by the brake system, the said springs positioned on the elongated member in series relation and spaced apart by a collar slidably mounted on the elongated member and acted upon by both springs and pivotally mounted means on the frame and to which the brake system is connected for operation, the pivotally mounted means being associated with and actuated by the said collar.

7. A car coupler and associated mechanism to actuate a brake system according to claim 6 and including in combination with the elongated member, manually operable means connected to the elongated member to rotate the member through a portion of a complete revolution whereby the collar will rotate therewith and the association between the collar and the pivotally mounted means will be broken whereby the elongated member may operate longitudinally without effecting operation of the brake system.

8. In a car including a brake system and a coupler whereby the car may be coupled to a companion car and the coupler subject to longitudinal movement relative to the car due to buff forces acting on the coupler, the combination with the coupler and brake system of mechanism to transmit motion from the coupler to the brake system to actuate the system when the said forces acting upon the coupler exceed a predetermined value, the said coupler including means to limit the said movement of the brake system before the buff force exceeds a predetermined value which is greater than the first said predetermined value, spring means associated with the mechanism to control its operation and the movement of the brake system while the coupler is subjected to buff forces between the said predetermined values and other spring means associated with and movable as a whole with the mechanism and acting upon the brake system to prevent the pressure exerted by the brake system exceeding a predetermined value during movement of the coupler between the predetermined buff forces.

9. A car coupler comprising, a coupler head, an anchorage whereby the head may be mounted on a car, the anchorage comprising a housing for attachment to the car and rearwardly movable support means mounted in the housing and to which the coupler head is attached, the coupler head being subject to compressive forces, means to hold the movable support in spaced relation to the housing and to prevent forward movement of the support means and coupler head whereby said spaced relation would be increased, mechanism associated with the coupler and coacting with the said movable support means to prevent movement of said support means under a compressive force until the said compressive force reaches a predetermined value and means on the said movable support to engage means on the housing to stop the longitudinal movement of the support when a predetermined compressive force greater than the first said predetermined force is reached regardless of the magnitude of such greater force, resilient means associated with the said support means to absorb compressive forces of less value and of greater value respectively than the aforesaid forces and all draft forces thereon.

10. Mechanism to control the automatic setting of the brakes on a car through the medium of the compressive force acting on the coupler comprising, a rearwardly movable resilient support for attachment to a car to absorb all draft forces thereon and all buff forces up to a predetermined value, a coupler head connected to the support and both arranged to move backward from their normal or zero position when the buff force thereon exceeds said predetermined value, means to limit the said movement when the compressive force upon the coupler head exceeds the said predetermined value by a predetermined amount, spring means having an initial compression of a predetermined value and movable rearwardly as a whole when the coupler head and resilient support move rearwardly to limit the pressure which may be exerted by the brake system to that of the initially installed value of the spring means, and other means associated with the mechanism and controlled by said spring means to cooperate with and to actuate the brake system, the said other means arranged to be actuated by the spring means until the pressure exerted by the brake system equals that of the spring means.

11. A car coupler comprising a coupler head, an anchorage by means of which the coupler head may be mounted on a car, an elongated longitudinally movable member, a longitudinally movable support to which the coupler head is secured interposed between the coupler head and the elongated member and movable in one direction by either the elongated member or the coupler head due to draft forces thereon and movable in the other direction only by the coupler head due to the compressive forces thereon, yieldable means on the elongated member to prevent the rearward movement of the coupler head, its support and the elongated member until the compressive force on the coupler head exceeds a predetermined value and to move the coupler head, its support and the elongated member forward when the compressive force on the coupler head falls below said predetermined value and other yieldable means mounted on the elongated member and cooperating with the first said yieldable means to effect said forward movement of the said parts.

12. A car coupler comprising a coupler head, an anchorage by means of which the coupler head may be mounted on a car, the anchorage including longitudinally movable support means to which the coupler head is attached and movable with the support means under compressive forces acting upon the coupler head, longitudinally movable and rotatable means projecting rearwardly from said support means and arranged to be moved by the support means, resilient means associated with the elongated means and cooperating therewith to prevent said longitudinal movement of the elongated means and support means until the compressive force acting upon the coupler head exceeds a predetermined value, means associated with the elongated means to limit the rearward longitudinal movement of the elongated means after it has moved a predetermined amount, and means connected to the elongated means whereby the elongated means may be manually rotated for the purpose described.

13. In combination, a car, an anchorage including a longitudinally movable support whereby a coupler may be mounted on the car, a coupler head attached to the movable support, a brake system for the car including actuating means therefor, operating and control means actuated by the movement of the support to impart movement to the actuating means to operate the brake system to apply the brake, the operating and control means comprising a longitudinally movable member and a high compressive spring and a low compressive spring, each spring associated with the movable member and normally under installed compression of predetermined value, the said springs so constructed and arranged relative to the longitudinally movable member and to the actuating means for the brake system that the low compression spring will resist movement of the movable support and longitudinally movable member until the buff force acting on the movable support exceeds a predetermined value and the high compressive spring will determine the limit of pressure which may be exerted by the brake system as the coupler moves rearwardly under buff forces.

14. Mechanism for automatically operating a brake system on a car comprising, an anchorage for attachment to a car, the anchorage including a housing and support means to absorb buff and draft forces and movable longitudinally under buff forces when they exceed a predetermined value, means normally holding the support means in predetermined spaced relation to the housing and to prevent the said space increasing under draft forces on the support means, a coupler head attached to the support means and movable therewith, mechanism operatively associated with the support means and actuated by the coupler movements to actuate the brake system and set the brakes, means associated with the mechanism to prevent operation of the mechanism until the buff force upon the coupler exceeds a predetermined value.

ERNST A. LARSSON.

REFERENCES CITED

The following references are of record in the file of this patent:

UNITED STATES PATENTS

| Number | Name | Date |
| --- | --- | --- |
| 112,499 | Russell | Mar. 7, 1871 |
| 235,749 | Crollard | Dec. 21, 1880 |
| 321,757 | Reese | July 7, 1885 |
| 446,504 | Arnold | Feb. 17, 1891 |
| 293,263 | Meatyard | Feb. 12, 1884 |
| 262,636 | Berg | Aug. 15, 1882 |
| 235,916 | Tallman | Dec. 28, 1880 |
| 377,437 | Reese | Feb. 7, 1888 |
| 2,138,267 | Christenson | Nov. 29, 1938 |